(12) United States Patent
Ohya et al.

(10) Patent No.: US 8,865,793 B2
(45) Date of Patent: Oct. 21, 2014

(54) WATER-BASED INK-JET RECORDING INK

(75) Inventors: Hidenobu Ohya, Tokyo (JP); Masayuki Ushiku, Kanagawa (JP); Tomoe Kawanami, Kanagawa (JP)

(73) Assignee: Konica Minolta Holdings, Inc., Tokyo (JP)

( * ) Notice: Subject to any disclaimer, the term of this patent is extended or adjusted under 35 U.S.C. 154(b) by 822 days.

(21) Appl. No.: 12/527,567

(22) PCT Filed: Feb. 20, 2008

(86) PCT No.: PCT/JP2008/052831
§ 371 (c)(1),
(2), (4) Date: Aug. 18, 2009

(87) PCT Pub. No.: WO2008/105289
PCT Pub. Date: Sep. 4, 2008

(65) Prior Publication Data
US 2010/0093900 A1      Apr. 15, 2010

(30) Foreign Application Priority Data

Feb. 26, 2007  (JP) ................................. 2007-045331
Mar. 9, 2007   (JP) ................................. 2007-059790

(51) Int. Cl.
| | | |
|---|---|---|
| *A61K 9/16* | (2006.01) | |
| *C08F 283/00* | (2006.01) | |
| *C08G 18/80* | (2006.01) | |
| *C08J 3/02* | (2006.01) | |
| *C08K 3/20* | (2006.01) | |
| *C08K 5/15* | (2006.01) | |
| *C08K 5/34* | (2006.01) | |
| *C08K 5/35* | (2006.01) | |
| *C08K 5/45* | (2006.01) | |
| *C08K 5/48* | (2006.01) | |
| *C09D 5/00* | (2006.01) | |
| *C09D 11/00* | (2014.01) | |
| *B41M 7/00* | (2006.01) | |

(52) U.S. Cl.
CPC . *B41M 7/00* (2013.01); *C90D 11/30* (2013.01)

USPC ............... 523/160; 523/161; 524/82; 524/86; 524/94; 524/96; 524/107; 524/457; 524/453

(58) Field of Classification Search
USPC .......... 523/160, 161; 524/82, 86, 94, 96, 107, 524/457, 543
See application file for complete search history.

(56) References Cited

U.S. PATENT DOCUMENTS 5,814,685 A * 9/1998 Satake et al. .................. 523/201

FOREIGN PATENT DOCUMENTS

| EP | 0-974-626 | 1/2000 |
|---|---|---|
| EP | 1-561-788 | 8/2005 |
| JP | 200044858 | 2/2000 |
| JP | 2004114692 | 4/2004 |
| JP | 2005113147 | 4/2005 |
| JP | 2005220352 | 8/2005 |
| JP | 200622328 | 1/2006 |
| JP | 2006282822 | 10/2006 |

OTHER PUBLICATIONS

EP Supplementary European Search Report No. EP 08 71 1637 (4 pages).

* cited by examiner

Primary Examiner — Patrick Niland
(74) Attorney, Agent, or Firm — Lucas & Mercanti, LLP

(57) ABSTRACT

An ink-jet recording ink which is utilized for printing on a heated recording medium, wherein the ink contains at least (1) a pigment, (2) an ink-soluble resin of 2-10 weight % based on a solid content, (3) a water-soluble organic solvent, and (4) a silicone type or a fluorine type surfactant, and the ink-soluble resin and the water-soluble organic solvent satisfy the following conditions: 1) at least one type of the ink-soluble resin is provided with a carboxyl group as an acid group, and an acid value of not less than 80 and less than 300, and 2) the water-soluble organic solvent contains at least 5-15 weight % of solvent A, and 2-15 weight % of solvent B; solvent A: a glycol ether or 1,2-alkanediols, and solvent B: a cyclic solvent, a cyclic ester solvent or a dimethyl sulfoxide, containing a nitrogen or a sulfur atom.

4 Claims, No Drawings

WATER-BASED INK-JET RECORDING INK

CROSS REFERENCE TO RELATED APPLICATION

This is a U.S. National Phase Application under 35 U.S.C. 371 of International Application PCT/JP2008/052831 filed on Feb. 20, 2008, which claims the priority of Japanese Application No. 2007-045331, filed Feb. 26, 2007, which, in turn, claims the priority of JP 2007/059790, filed Mar. 9, 2007, the entire content of all three Applications are hereby incorporated by reference.

FIELD OF THE INVENTION

The present invention relates to a new water-based ink-jet recording ink utilized for printing with heating of a recording medium.

BACKGROUND OF THE INVENTION

As an ink-jet ink for industrial application, an ink which enables printing directly on non-absorptive medium such as a vinyl chloride sheet has been developed in recent years. These inks include a solvent ink which utilizes an organic solvent as a vehicle and a UV ink comprising a polymerizing monomer as a primary component. A solvent ink has a problem of a large amount of VOC, which is a recent social problem, because the solvent is evaporated into the air by drying. Further, there is a risk of influence of such as odor and safety affairs on workers resulting in requirement of a facility countermeasure such as for sufficient ventilation. A UV ink shows VOC of nearly zero since it is cured immediately after printing; however, many of them cause skin sensitization depending on a utilized monomer, which is a problem, and further it is not necessarily applicable in every field because of a restriction from assembling of an expensive UV light source into a printer. Further, in the case of printing a UV ink on a sheet of such as a glossy type, glossy feeling is remarkably deteriorated.

In this background, development of an ink which has small environmental load and enables direct printing on a non-absorptive medium with a water-based ink (a water-based ink-jet recording ink) comprising water as a primary component, which has been conventionally widely utilized in such as home, has been on the way.

In Patent Document 1, a water-based ink containing a solvent compatible with water selected from a group comprising glycol and glycol ether is proposed, and further an ink containing a graft polymer binder which has a hydrophobic, main chain and a nonionic hydrophilic side chain and which is soluble in a water-based vehicle but insoluble in water is proposed. However, it is not disclosed that those having a structure provided with an acid group is utilized as said binder. Further, according to study of inventors of this invention, image quality is not sufficient on a water non-absorptive recording medium according to disclosed technologies, and durability of obtained images is insufficient. In addition to these, recovery through maintenance is not satisfactory. Further, drying property after printing is not sufficient to generate print-through at winding.

In Patent Document 2, a printing ink, for printing on a substrate covered with an untreated vinyl sheet or vinyl, by means of a piezo printing system provided with at least one heating apparatus, which is comprised of a liquid medium, a water-insoluble colorant, a polymer binder, a drying restrainer and other additives, and said liquid medium is constituted of water and a water-miscible drying restrainer, wherein the liquid medium contains at least 80 weight % of water, the content of the drying restrainer is comprised of at least butyl diglycol and 1-methoxy propanol, the ink has a pH value of not less than 8.5, and the binder exists in a state of being dissolved in a liquid ink, has been proposed. According to study of inventors of this invention, in the disclosed technology, image quality on a water non-absorptive recording medium is insufficient, ejection is unstable, and recovery through maintenance is unsatisfactory. Further, drying property after printing is insufficient to generate print-through at winding.

Further, in Patent Documents 3-6, a water-based ink incorporated with resin micro-particles which is insoluble in the ink as a binder resin has been disclosed. This type shows relatively stable ejection behavior, however, image quality on a water non-absorptive medium is insufficient and recovery through maintenance is unsatisfactory.

The following requirements are desired for an ink which is capable of printing also on a water non-absorptive medium.
(1) To be capable of printing on a water non-absorptive recording medium with high quality
(2) Durability of an obtained image is high
(3) Drying on a water non-absorptive medium is rapid
(4) To be capable of stable ejection
(5) To be capable of stable printing for a long period and to exhibit easy recovery through maintenance However, no inks according to conventional technologies satisfy the all requirements, and argent development is desired.

Patent Document 1: Unexamined Japanese Patent Application Publication No. (hereinafter, referred to as JP-A) JP-A 2000-44858
Patent Document 2: JP-A 2005-113147
Patent Document 3: JP-A 2004-114692
Patent Document 4: JP-A 2005-220352
Patent Document 5: JP-A 2006-22328
Patent Document 6: JP-A 2006-282822

SUMMARY OF THE INVENTION

Problems to be Solved by the Invention

This invention has been made in view of the above problems. An object of this invention is to provide an ink-jet recording ink which enables printing of high quality images on a water non-absorptive medium only by heating of the recording medium, rapidly dries on a water non-absorptive medium, is capable of stable ejection, enables printing for a long period, and enables easy recovery through maintenance.
Means to Solve the Problems The above-described object of this invention can be achieved by the following constitutions.

Item 1. An ink-jet recording ink which is utilized for printing on a heated recording medium, wherein the ink contains at least (1) a pigment, (2) an ink-soluble resin of 2-10 weight % based on a solid content, (3) a water-soluble organic solvent, and (4) a silicone type or a fluorine type surfactant, and the ink-soluble resin and the water-soluble organic solvent satisfy the following conditions:

1) at least one type of the ink-soluble resin is provided with a carboxyl group as an acid group, and an acid value between not less than 80 but less than 300, and 2) the water-soluble organic solvent contains at least 5-15 weight % of solvent A, and 2-15 weight % of solvent B;
Solvent A: a glycol ether or 1,2-alkanediols,
Solvent B: a cyclic solvent containing a nitrogen or a sulfur atom, a cyclic ester solvent or dimethyl sulfoxide.

Item 2. The water-based ink-jet recording ink described in item 1 above, wherein the ink-soluble resin has a weight average molecular weight of 3000-30000, and a glass transition temperature of −30 to 100 °C., and an acid group derived from an acid monomer which has been partially or completely neutralized by an amine having a boiling point of less than 200° C.

Item 3. The water-based ink-jet recording ink described in item 2 above, wherein the amine having a boiling point of less than 200° C. is selected from ammonia, an alkanolamine, and an alkylamine.

Item 4. The water-based ink-jet recording ink described in any one of items 1-3 above, wherein the ink contains an aqueous emulsion polymer.

EFFECTS OF THE INVENTION

This invention can provide a water-based ink-jet recording ink which enables high image quality printing on a water non-absorptive recording medium only by heating of the recording medium, has high durability, rapidly dries on a non-absorptive medium, is capable of stable ejection and stable printing for a long period, and enables easy recovery through maintenance.

DETAILED DESCRIPTION OF THE INVENTION

As a result of extensive study in view of the above-described problems, the inventors of this invention have found that a water-based ink-jet recording ink, which enables high image quality printing on a water non-absorptive recording medium only by heating of the recording medium, has high durability, rapidly dries on a non-absorptive medium, is capable of stable ejection and stable printing for a long period, and enables easy recovery through maintenance, can be provided by a water-based ink-jet recording ink which contains at least (1) a pigment, (2) an ink-soluble resin of 2-10 weight % based on solid content, (3) a water-soluble organic solvent and (4) a silicone type or fluorine type surfactant, and said ink-soluble resin and said water-soluble organic solvent satisfy the following conditions, which resulted in this invention.

Conditions:

1) At least one type of the ink-soluble resin is provided with a carboxyl group and an acid value of not less than 80 and less than 300.

2) The water-soluble organic solvent contains at least 5-15 weight % of following solvent A and 2-15 weight % of following solvent B.

Solvent A: a glycol ether or 1,2-alkanediols

Solvent B: a cyclic solvent containing a nitrogen or sulfur atom, a cyclic ester solvent or dimethylsulfoxide In the following, the constitutions of this invention will be detailed.

(Pigment)

A pigment utilized in a water-based ink-jet recording ink (hereinafter, also simply referred to as an ink) of this invention may be any one provided being stably dispersible in a water phase and can be selected from such as a pigment dispersion in which a pigment is dispersed by polymer resin, capsule pigment in which a pigment is covered with a water insoluble resin, self-dispersible pigment in which the surface of a pigment is modified to be dispersible without a dispersion resin. In the case of storage stability of ink is important, capsule pigment in which a pigment is covered with a water-insoluble resin is preferably selected.

In the case of utilizing a pigment dispersion in which a pigment is dispersed with a polymer resin, those being water soluble may be utilized as a polymer resin. A water-soluble resin preferably utilized includes such as styrene-acrylic acid-acrylic acid alkyl ester copolymer, styrene-acrylic acid copolymer, styrene-maleic acid copolymer, styrene-maleic acid-acrylic acid alkyl ester copolymer, styrene-methacrylic acid copolymer, styrene-methacrylic acid-acrylic acid alkyl ester copolymer, styrene-maleic acid half ester copolymer, vinyl naphthalene-acrylic acid copolymer and vinyl naphthalene-maleic acid copolymer.

As for a dispersion method of a pigment, various types such as a ball mill, a sand mill, an atliter, a roll mill, an agitator, a Henschel mixer, a colloidal mill, a ultrasonic homogenizer, a pearl mill, a wet-type jet mill and a paint shaker can be utilized.

In this invention, it is also preferable to utilize a centrifugal separator or to utilize a filter for elimination of coarse particles in a pigment dispersion.

Further, in the case of utilizing capsule pigment in which a pigment is covered with a water-insoluble resin, a water-insoluble resin refers to a resin which is insoluble in water in a range of weak acidic to weak basic, and preferably the solubility of which against aqueous solution of pH 4-10 is less than 2 weight %.

Such a resin includes each resin of such as an acryl type, a styrene-acryl type, an acrylonitrile-acryl type, a vinyl acetate type, a vinyl acetate-acryl type, a vinyl acetate-vinyl chloride type, a polyurethane type, a silicone-acryl type, an acryl silicone type, a polyester type and an epoxy type.

Further, in this invention, a resin containing hydrophilic monomer and hydrophobic monomer can be utilized as a resin.

Hydrophobic monomer include such as acrylic acid ester (such as n-butyl acrylate, 2-ethylhexl acrylate and 2-hydroxyethyl acrylate), methacrylic acid ester (such as ethylmethacrylate, butyl methacrylate and glycidyl methacrylate) and styrene.

Hydrophilic monomer includes such as acrylic acid, methacrylic acid and acrylamide, and those having been neutralized by base after polymerization are preferably utilized as for those having an acid group such as acrylic acid.

As for the molecular weight of a resin, those having a weight average molecular weight Mw of 3,000-500,000 can be utilized. It is preferable to utilize those having Mw of 7,000-200,000.

As for Tg of a resin, those having a Tg of approximately −30-100° C. may be utilized. Those having a Tg of approximately −10-80° C. are preferably utilized.

As for a polymerization method, solution polymerization or emulsion polymerization can be utilized. The polymerization may be conducted in advance separately from a pigment, or may be conducted by supplying a monomer into a system in which a pigment having been dispersed.

As a method to cover a pigment by a resin, various methods well known in the art can be employed, however, it is preferable to select from a method in which a pigment is dispersed by use of a polymerizing surfactant and a monomer is supplied into the resulting system to perform covering with polymerization, in addition to a phase inversion emulsification method and an acid precipitation method.

More preferable is a manufacturing method in which a water-insoluble resin is dissolved in an organic solvent such as methyl ethyl ketone, acid groups in the resin having been neutralized with a base, a pigment and ion-exchanged water being added to be dispersed, and then the organic solvents are removed and water is appropriately added, whereby a pigment dispersion is prepared.

The weight ratio of a pigment to a resin may be selected in a range of 100/40-100/150 as a pigment/resin. ratio. Particularly, image durability, ejection stability and ink storage stability are excellent in a range of 100/60-100/110.

The mean particle size of pigment particles covered with a water-insoluble resin is preferably approximately 80-150 nm with respect to ink storage stability and coloring ability.

The mean particle size can be determined by use of a particle size analyzer available on the market employing such as an optical scattering method, an electrophoresis method and a laser Doppler method. Further, it can be also determined by particle image picturing by use of a transparent type electron-microscope with respect to at least not less than 100 particles and a statistical processing of said images by use of an image analyzing software such as Image-Pro (manufactured by Media Cybernetics Inc.)

Further as a self-dispersible pigment, those having been subjected to a surface treatment available on the market can be also utilized, which include such as CABO-JET200 and CABO-JET300 (produced by Cabot Corp.); and BONJET CWl (produced by Orient Chemical Industries, Ltd.).

A pigment utilizable in this invention includes organic and inorganic pigments conventionally well known in the art. For example, listed are azo pigment such as azo lake, insoluble azo pigment, condensed azo pigment and chelate azo pigment; polycyclic pigment such as phthalocyanine pigment, perylene and perylene pigment, anthraquinone pigment, quinacridone pigment, dioxazine pigment, thioindigo pigment, isoindolinone pigment and quinophthalone pigment; dye lake such as basic dye type lake and acidic dye type lake; organic pigment such as nitro pigment, nitroso pigment, aniline black and daylight fluorescent pigment; and inorganic pigments such as carbon black.

Specific organic pigments will be exemplified below.

Pigments for magenta or red include such as C. I. Pigment Red 2, C. I. Pigment Red 3, C. I. Pigment Red 5, C. I. Pigment Red 6, C. I. Pigment Red 7, C. I. Pigment Red 15, C. I. Pigment Red 16, C. I. Pigment Red 48:1, C. I. Pigment Red 53:1, C. I. Pigment Red 57:1, C. I. Pigment Red 122, C. I. Pigment Red 123, C. I. Pigment Red 139, C. I. Pigment Red 144, C. I. Pigment Red 149, C. I. Pigment Red 166, C. I. Pigment Red 177, C. I. Pigment Red 178 and C. I. Pigment Red 222.

Pigments for orange or yellow include such as C. I. Pigment Orange 31, C. I. Pigment Orange 43, C. I. Pigment Yellow 12, C. I. Pigment Yellow 13, C. I. Pigment Yellow 14, C. I. Pigment Yellow 15, C. I. Pigment Yellow 17, C. I. Pigment Yellow 74, C. I. Pigment Yellow 93, C. I. Pigment Yellow 94, C. I. Pigment Yellow 128 and C. I. Pigment Yellow 138.

Pigments for green or cyan include such as C. I. Pigment Blue 15, C. I. Pigment Blue 15:2, C. I. Pigment Blue 15:3, C. I. Pigment Blue 16, C. I. Pigment Blue 60 and C. I. Pigment Green 7.

(Ink-Soluble Resin)

An ink of this invention contains an ink-soluble resin of 2-10 weight % based on solid content. An ink-soluble resin is a resin which is soluble against a liquid (an ink vehicle), which is an ink except a pigment, a dispersion resin and a soluble resin, at not less than 10 weight % based on solid content at room temperature (25° C.).

An ink-soluble resin utilized in this invention is preferably a resin, which is stably dissolved in an ink, however, which is provided with water-resistance after being dried on a medium, since it has a function as a binder resin to improve durability of images.

As such a resin, those having a hydrophobic component and a hydrophilic component at a certain balance are designed. At this time, a hydrophilic component is preferably either ionic or nonionic, however, more preferably ionic and furthermore preferably anionic. Specifically preferable are anionic ones provided with water-soluble property by neutralization with a volatile base component.

At least one type of an ink-soluble resin, which is provided with a carboxyl group as an acid group, and with an acid value of not less than 80 and less than 300 and preferably of 90-200, is preferably utilized with respect to exhibiting the effects of this invention.

The acid value can be measured based on JIS K0070. The resin is unstable in an ink of this invention when the acid value is less than 80 to be inferior in ink storage stability, ejection stability and recovery through maintenance. Image quality and image durability are poor when the acid value is not less than 300.

Such a resin includes each resin of an acryl type, a styrene-acryl type, an acrylonitrile-acryl type, a vinyl acetate-acryl type, a polyurethane type and a polyester type.

As for a resin, a resin containing a hydrophobic monomer and a hydrophilic monomer can be utilized.

Hydrophobic monomer includes such as acrylic acid ester (such as n-butyl acrylate, 2-ethylhexyl acrylate and hydroxyethyl acrylate), methahcrylic acid ester (such as ethylmethacrylate, butylmethacrylate and glycidyl methacrylate) and styrene.

Hydrophilic monomer includes such as acrylic acid, methacrylic acid and acrylamide, and those having been neutralized with base after polymerization are preferably utilized as for those having an acid group such as acrylic acid.

As the molecular weight of a resin, those having a weight average molecular weight. Mw of 3000-30000 can be utilized. It is preferable to utilize those having Mw of 7000-20000.

As for Tg of a $resin_s$ those having a Tg of approximately −30 to 100° C. may be utilized. Those having a Tg of approximately −10 to 80° C. are preferably utilized.

As for a polymerization method, solution polymerization is preferably employed.

The acid group arising from acid monomer of a resin is preferably partly or completely neutralized with a base component. In this case, as neutralizing base, alkali metal containing base such as sodium hydroxide and potassium hydroxide and amines (such as ammonia, alkanolamine and alkylamine) can be utilized. It is specifically preferable to perform neutralization with amines having a boiling point of lower than 200° C. with respect to image durability.

As for the addition amount of a resin, it is preferably utilized at an amount of 2-10 weight % and more preferably of 3-6 weight % to achieve the object of this invention.

In this invention, the reason why it is preferable to incorporate 2-10 weight % of an ink-soluble resin is estimated as follows.

It is important to prevent image quality deterioration such as beading and color bleed due to ink mixing in addition to wetting property against a medium, which was explained before as a requirement for high image quality printing on an ink non-absorptive medium, for example, on a polymer type sheet such as a vinyl chloride sheet. Particularly, in the case that an absorption process into a medium, which has been employed in conventional ink-jet technologies, cannot be utilized, it is necessary to prevent ink mixing by other technical means. As a result of extensive study of the inventors of this invention, it has been found that it is effective to rapidly increase the viscosity of ink after landing to decrease fluidity for prevention of ink mixing. It is particularly effective with an ink to print with heating of a medium such as in this invention. Further, in this case, it has been found that it is important to utilize an ink-soluble resin of 2-10 weight % based on solid content as binder resin. Prevention of ink mixing is insufficient because of small degree of viscosity increase at less than 2 weight % and high image quality cannot be obtained. Further, in the case of addition of over 10 weight %, it is impossible to realize an ink which exhibits high storage stability, stable ejection, stable printing for a long period and easy recovery through maintenance. An ink incorporated with such a resin according to conventional technologies as a binder resin cannot sufficiently achieve this viscosity increase with drying. The ink viscosity increase with drying is specifically remarkably exhibited with an ink utilizing a water-soluble organic solvent selected from glycol ether or 1,2-alkanediol. Probably, it is estimated that the ratio of glycol ether or 1,2-alkanediol in landed ink increases owing to progress of evaporation of water content with drying, which increase interaction of an ink-soluble resin each other resulting in viscosity increase. When an ink-soluble resin, acid groups of which are partially or completely neutralized with amines having a boiling point of lower than 200° C., is utilized, ink mixing can be more effectively prevented. As was explained before, it is important to rapidly increase viscosity and reduce fluidity after landing of ink for prevention of ink mixing, and it is considered that when a resin, acid groups of which arising from acid monomer have been partially or completely neutralized with amines having a boiling point of lower than 200° C., is utilized, amines as a neutralizing component evaporates after landing to rapidly reduce solubility of the resin resulting in rapid increase of viscosity. It is specifically effective due to a large viscosity increasing effect when printing is performed with heating of a medium. When the boiling point of amines is not lower than 200° C., evaporation of amines will become slow to disable a large effect. Further, resins neutralized with alkali metal cannot provide a large effect.

(Water-soluble Organic Solvent)

An ink of this invention contains at least 5-15 weight % of following solvent A of and 2-15 weight % of following solvent B.

Solvent A: glycol ether or 1,2-alkanediols

Solvent B: a cyclic solvent containing a nitrogen or sulfur atom, a cyclic ester solvent or dimethylsulfoxide Glycol ether of solvent A includes such as ethyleneglycol monomethyl ether, ethyleneglycol monobutyl ether, diethyleneglycol monobutyl ether, triethyleneglycol monobutyl ether, propyleneglycol monopropyl ether, dipropyleneglycol monomethyl ether and tripropyleneglycol monobutyl ether.

Further, 1, 2-alkanediols include 1,2-butanediol, 1,2-pentanediol, 1,2-butanediol, 1,2-pentanediol, 1,2-hexanediol and 1,2-butanediol.

Solvent B is preferably a solvent capable of dissolving, softening or swelling resin. Resin referred here is a resin in a recording medium which is recorded with an ink of this invention.

A cyclic solvent containing a nitrogen atom is preferably ,a cyclic amide compound and a 5-7-member ring, and includes such as 2-pyrrolidone, N-methyl-2-pyrrolidone, N-ethyl-2-pyrrolidone, 1,3-dimethylimidazolidinone, 1,3-dimethyl-2-imizolidinone, s-caprolactam, methylcaprolactam and 2-aza-cyclooctanone. A cyclic solvent containing a nitrogen atom other than cyclic amide includes formylmorpholine. A cyclic solvent containing a sulfur atom is preferably a cyclic amide compound and a 5-7-member ring and includes such as sulforane.

A cyclic ester solvent includes such as γ-butyllactone and ε-caprolactone.

Solvent A is considered to be related to two points with respect to high image quality as an effect of this invention. As for one point, the surface tension of an ink is sufficiently lowered to enable preparation of the ink which has sufficient wetting property against a water non-absorptive medium such as vinyl chloride and generates no image quality defects such as repelling, by utilizing not less than 5 weight % of solvent A together with a surfactant utilized in this invention. Further, as for another point, ink viscosity will rapidly increase due to an emphasized viscosity increase effect after landing of ink with drying, which results in fluidity decrease of ink, restrained ink mixing, decreased beading and decreased color bleed, whereby high image quality is obtained. In both of the viewpoints, it is preferable that a large effect is obtained at addition of up to 15 weight %, however, it is not preferable that storage stability of ink is deteriorated at addition of over 15 weight %.

Solvent B is estimated to be related with two points of high image durability and drying property which are the effects of this invention. Solvent B is preferably one capable of dissolution, softening or swelling of a recoding medium such as vinyl chloride.

An ink itself has very small function to dissolve, soften or swell a recording medium such as vinyl chloride, however, the concentration of solvent B increases in accordance with evaporation of water content or other solvents by drying with heat after landing, whereby function to dissolve, soften or swell a recording medium such as vinyl chloride is exhibited. Therefore, drying property of ink is increased because penetration drying into vinyl chloride is probably applied in addition to evaporation. It is specifically effective in combination with solvent A. This is considered because solvent A itself has function to dissolve, soften or swell a recording medium such as vinyl chloride, although not as much as solvent B. Since solvent B dissolves, softens or swells a recording medium such as vinyl chloride, the medium is considered to have strong adhesion property with a binder and a polymer dispersant utilizable for a pigment in an ink resulting in improvement of image durability. It has been proved that to utilize solvent B in combination with solvent A is effective also in this function. Solvent B can exhibit the effect of this invention when being added at not less than 2 weight % and to utilize not less than 5 weight % is more preferable. When it is over 15 weight %, it is not preferable because ink storage stability is deteriorated and printer members are dissolved, softened and swelled.

As an ink-soluble resin, a resin acid groups of which arising from acid monomer are partly or completely neutralized with amines having a boiling point of lower than 200° C. is specifically preferably utilized; however, there is a problem in such a resin that amine is liable to evaporate and such as ink residue adhered on the head portion easily cause viscosity increase to make it difficult to be removed by wiping. However, by addition of solvent B of this invention into an ink at 2-15%, there is an effect of making removing property easier. Solvent B does not disturb viscosity increase with drying of a resin probably because said solvent penetrates into vinyl chloride on vinyl chloride as a recording medium. In this manner, as an ink-soluble resin, it is specifically preferable to utilized a resin acid groups of which arising from acid monomer are partly or completely neutralized with amines having a boiling point of lower than 200° C. and solvent B in combination.

An ink of this invention can be incorporated with a solvent other than glycol ether or 1,2-alkanediol.

Specifically, as a solvent utilizable in this invention, a water-based liquid medium is preferably utilized, and a mixed solvent of such as water with a water-soluble organic solvent is more preferably utilized. Examples of a water-soluble organic solvent preferably utilized include alcohols (such as methanol, ethanol, propanol, isopropanol, butanol, isobutanol, secondary butanol and tertiary butanol), polyhydric alcohols (such as ethylene glycol, diethylene glycol, triethylene glycol, polyethylene glycol, propylene glycol, dipropylene glycol, polypropylene glycol, butylene glycol, hexanediol, pentanediol, glycerin, hexanetriol and thioglycol), amines (such as ethanolamine, diethanolamine, triethanolamine, N-methyl diethanolamine, N-ethyl diethanol amine, morpholine, N-ethylmolpholine, ethylenediamine, diethylenediamine, triethylenetetramine, tetraethylenepentamine, polyethyleneimine, pentamethyldiethylenetriamine and tetramethylpropylenediamine), amides (such as formamide, N,N-dimethylformamide and N,N-dimethylacetoamide), heterocycles (such as 2-pyrrolidone, N-methyl-2-pyrrolidone, cyclohexyl pyrrolidone, 2-oxazolidone and 1,3-dimethyl-2-imidazolidinone) and sufoxides (such as dimethylsulfoxide).

(Surfactant)

In this invention, silicone type or fluorine type surfactants are utilized. It is also possible to secure wetting property against such as vinyl chloride by adding a large amount such as approximately 50 weight % of glycol ether or 1,2-alkanediols of this invention; however, image quality is insufficient and it is also difficult to secure ink storage stability and ejection stability. Therefore, by glycol ether or 1,2-alkanediols together with a surfactant of a silicone type or a fluorine type, wetting property against more variety of recording media can be obtained.

<Silicone Type Surfactant>

A silicone type surfactant is also referred to as a silicone surfactant and is preferably a polyether modified polysiloxane compound and includes such as KF-351A and KF-642 which are produced by Shin-Etsu Chemical Co., Ltd., and BY347 and BYK348 which are produced by BYK-Chemie GmbH.

<Fluorine Type Surfactant>

A fluorine type surfactant is also referred to as a fluorine surfactant and means general surfactants in which a part of or the total of hydrogen bondings to carbon of a hydrophobic group is substituted by fluorine. Among them, those having a perfluoroalkyl group in a molecule are preferred. Certain types among fluorine type surfactants are each available on the market under a product name of Megafac F from Dainippon Ink & Chemicals, Inc., Surflon from Asahi Glass Co., Ltd., Fluorad FC from 3M Company, Monflor from Imperial Chemical Industries, Zonyls from E. I. du Pont de Numours and Company, Licowet VPF from Hoechst AG, and Ftergent from Neos Corp. Further, a nonionic fluorine type surfactant includes, for example, Megafax 144D produced by Dainippon Ink & Chemicals, Inc., Surflon S-141 and Surflon 5-145 produced by Asahi Glass Co., Ltd. and Ftergent 251 produced by Neos Co., Ltd. In the ink of this invention, it is preferable to further contain an aqueous emulsion polymer.

That is, it is preferable that durability of images is further improved when an aqueous emulsion polymer is added in an ink-soluble resin which is utilized in an ink of this invention. The total amount of resins is increased when an aqueous emulsion polymer is added in addition to an ink-soluble resin; however, it is preferable because effects on ejection stability and ink storage stability are small.

As an aqueous emulsion polymer, a dispersion polymerized in a water phase, as it is or having been subjected to a treatment, or a polymer polymerized in a solvent system having been dispersed in a water phase may be utilized, and it can be selected from such as an acrylic type, a urethane type, a styrene type, a vinyl acetate type, a vinylidene chloride type, a vinyl chloride type, a styrene-butadiene type, a styrene-acrylonitrile type, a polybutadiene type, a polyethylene type, a polyisobutylene type and polyester type.

As physical properties of ink, it is preferable there is no share dependence on viscosity, and in this point of view, a dispersion form of an aqueous emulsion polymer is preferably those in which the concentration of an emulsifier such as a surfactant is made as small as possible, or dispersion polymer particles of a soap free type without employing an emulsifier. A preferable aqueous emulsion polymer is self-dispersible type dispersion of copolymer comprising polymerized employing at least unsaturated vinyl having a carboxyl group as a monomer component, and for example, is an acryl hydrosol, which is prepared from a dispersion prepared by emulsion polymerization or suspension polymerization of acrylic acid or maleic acid as a carboxylic acid monomer with a composition comprising acrylic monomer such as ethyl acrylate alone or ethylenic unsaturated monomer copolymerizable with acrylic monomer, the particles of which are divided with mechanical share after having been swelled with alkali. Herein, among acryl hydrosol, a monomer composition preferably contains styrene with respect to increasing refractive index of a resin to achieve high glossy feeling.

The aforesaid alkali is preferably amine such as ammonia, triethylamine, 2-dimethylaminoethanol, 2-di-n-butylamino-ethanol, methyldiethanolamine, 2-amino-2-methyl-1-propanol, diethanolamine, triethanolamine and 2-methylamino-ethanol; and ammonia, 2-amino-2-methyl-1-propanol and 2-methylaminoethanol are specifically preferable with respect to dispersion stability of aqueous emulsion polymer.

As the aforesaid acryl hydrosol, such as Johncryl (trade mark) of S. C. Johnson Polymer Ltd. is available on the market.

The glass transition temperature of water-dispersion polymer is preferably not lower than 35° C., and more preferably not lower than 49° C., with respect to enhancing anti-abrasion resistance of images. The upper limit of Tg is not specifically limited, however, it is possible to prepare flexible ink film and to prevent cracks of images due to bent of printed matter at a Tg of lower than approximately 100° C. The acid value of the aqueous emulsion polymer is preferably not less than 44 and more preferably not less than 60, with respect to achieving excellent re-dispersibility-solubility of dried ink film. The upper limit of acid value is not specifically limited, however, is preferably less than 110 in view of easy preparation of more stable dispersion.

The mean particle size of the aqueous emulsion polymer is preferably not more than 300 nm and more preferably not more than 130 nm with respect to achieving excellent glossy feeling without causing clogging in a nozzle of a head. The lower limit of the mean particle size is preferably not less than 30 nm with respect to manufacturing stability of micro-particles. Herein, the mean particle size of the aqueous emulsion polymer can be conveniently measured by use of a measurement apparatus available on the market employing such as an optical scattering method and a laser Doppler method. Further, the mean particle size can be converted from particles which are formed by freeze drying of a dispersion of the aqueous emulsion polymer observed through a transparent type microscope.

The content of the aqueous emulsion polymer is preferably not less than 0.7% and not more than 6% with respect to achieving excellent fixing property (anti-abrasion property, alcohol resistance) and long term storage stability of ink. It is more preferably not less than 1% and not more than 3%.

(Recording Medium)

An ink of this invention is suitable for printing on such as plain paper, coated paper and ink-jet exclusive paper in addition to on a non-absorptive medium such as vinyl chloride.

A non-absorptive medium includes such as a polymer sheet, a board (such as soft vinyl chloride, hard vinyl chloride, acryl and polyolefin types), glass, tile, rubber and synthetic paper.

A low-absorptive or absorptive medium includes such as plain paper (copy paper, plain paper for printing), coated paper, art paper, ink-jet exclusive paper, ink-jet glossy paper, corrugated cardboard paper and wood.

An ink of this invention is specifically suitable for a vinyl chloride sheet.

(Heating at Recording)

In this invention, printing is performed with heating of a recording medium.

By heating of a recording medium, a viscosity increase rate with drying is remarkably improved to enable preparation of high image quality. Further, durability of images is improved.

As for the heating temperature, heating is preferably performed to make the surface temperature of the recording side of the recording medium of 40-80° C. during printing. A temperature of lower than 40° C. is not preferable because of time consuming for drying in addition to insufficient image quality and insufficient image durability. It is impossible to perform stable printing at over 80° C. because of large influence against ink ejection behavior. It is more preferable to make the surface temperature of a recording medium of 40-60° C.

As for a heating method, selected can be such as a method in which a heater is installed in a medium transport system or in a platen member and heating is performed by a contact mode from the bottom of a recording medium, or a method in which heating is performed by a non-contact mode from the bottom or from the top of a medium by use of such as a lamp.

EXAMPLES

In the following, this invention will be specifically explained with reference to the example, but this invention not limited thereto.

Example

<<Preparation of Ink>>

(Synthesis of Dispersion Resin)

A flask equipped with a dropping funnel; a nitrogen introducing tube, a reflux condenser, a thermometer and a stirrer was charged with 50 g of methyl ethyl ketone and was heated at 75° C. while being subjected to nitrogen bubbling. In to the system, monomers comprising 75 g of n-butyl methacrylate, 5 g of butyl acrylate, 5 g of hydroxyethyl methacrylate and 15 g of acrylic acid; and a mixture of 50 g of methyl ethyl ketone with 500 mg of a polymerization initiator AIBN were titrated over 3 hours. After titration, the system was refluxed with heating for further 6 hours. After cooling, methyl ethyl ketone of evaporated amount was added, whereby a resin solution of dispersion resin D-1 (solid content of 50 weight %) was prepared.

(Preparation of Pigment Dispersion)

Synthesized resin dispersion D-1 solution of 100 g was added with a predetermined amount of a 20 weight % sodium hydroxide aqueous solution as a neutralizer to neutralized 100% of salt forming groups, and the resulting system, after having been gradually added with 50 g of a pigment (C: C. I. Pigment Blue 15:3, Y: C. I. Pigment Yellow 74, M: C. I. Pigment Red 122 or Bk: Carbon Black) with stirring, was kneading mixed for 2 hours by a beads mill. The prepared kneading mixture, after having been added with 400 g of ion-exchanged water and stirred, was subjected to evaporation removal of methyl ethyl ketone under reduced pressure and application of moisture. Further, ion-exchange water was added, whereby a pigment dispersion of each pigment C, Y, M and Bk was prepared.

(Synthesis of Ink-soluble Resin)

A flask equipped with a dropping funnel, a nitrogen introducing tube, a reflux condenser, a thermometer and a stirrer was charged with 50 g of methyl ethyl ketone and was heated at 75° C. while being subjected to nitrogen bubbling. Into the system, monomers described in Table 1 and a mixture of 50 g of methyl ethyl ketone with 500 mg of a polymerization initiator (AIBN) were titrated over 3 hours. After titration, the system was refluxed with heating for further 6 hours. After cooling, methyl ethyl ketone was removed by heating under reduced pressure. Dimethylaminoethanol of 1.05 times equivalent mole of acrylic acid, which had been added as a monomer, was dissolved in 450 ml of ion-exchange water, and into the resulting solution the above-described polymerization residue was dissolved. The concentration was adjusted by ion-exchanged water to prepare an ink-soluble resin aqueous solution of each ink-soluble resin R-1-R-7 (solid content of 50 weight %).

TABLE 1

Unit: g

| Ink-soluble resin No. | n-Butyl methacrylate | Butyl acrylate | *1 | Benzyl methacrylate | Acrylonitrile | Styrene | Acrylic acid | *2 | MW | Acid value |
|---|---|---|---|---|---|---|---|---|---|---|
| D-1 | 75 | 5 | 5 | | | | 15 | | 12000 | 117 |
| R-1 | 80 | | | | | | 20 | | 12000 | 155 |
| R-2 | | 40 | 5 | | | 30 | 25 | | 10000 | 194 |
| R-3 | 40 | | | | | 40 | 20 | | 9000 | 155 |
| R-4 | 65 | | 20 | | | | 15 | | 9000 | 117 |
| R-5 | 40 | | 10 | 10 | | | 40 | | 8000 | 311 |
| R-6 | 30 | 20 | 10 | 10 | 10 | | | 20 | 10000 | 56 |
| R-7 | 60 | | | 30 | | | 10 | | 6000 | 78 |

*1: 2-Hydroxyethyl methacrylate,
*2: 2-acrylamide-2-methylpropane sulfonate (Preparation of Monochromatic Ink)

A pigment dispersion, an ink-soluble resin, a water-soluble organic solvent and a surfactant were mixed as described in Table 2 and adjusted so as to make the total of 100 g by addition of ion-exchange water, followed by being filtered with a 5 μm filter, whereby monochromatic ink C-1-C-14, C-22-C-30 of this invention and comparative monochromatic ink C-15-C-21 were prepared.

Herein, in monochromatic ink C-27, C-28 and C-29, PDX-7667 (produced by Jhonson Polymer Corp., Tg of 35° C., acid value of 82) of 1.5 g, 3.0 g and 4.5 g in addition to compounds described in Table 2 were added, respectively, and in monochromatic ink C-30 of this invention, Jhoncryl 7600 (produced by Jhonson Polymer Corp., Tg of 35° C., acid value of 60) of 3.0 g was added in addition to compounds described in Table 2.

TABLE 2

| Ink No. | Pigment dispersion | | Ink-soluble resin | | Water-soluble organic solvent (1) | | Water-soluble organic solvent (2) | | Water-soluble organic solvent (3) | | Surfactant | | Remarks |
|---|---|---|---|---|---|---|---|---|---|---|---|---|---|
| | Types | Amount | Types | Amount | Types | Amount | Types | Amount | Types | Amount | Types | Amount | |
| C-1 | P-1 | 5 | R-1 | 5 | 1,2-HDO | 5 | γ-BL | 5 | DEG | 10 | Si | 0.6 | Inv. |
| C-2 | P-1 | 5 | R-1 | 5 | 1,2-HDO | 10 | γ-BL | 2.5 | DEG | 10 | Si | 0.6 | Inv. |
| C-3 | P-1 | 5 | R-1 | 5 | DEGBE | 10 | γ-BL | 10 | DEG | 5 | Si | 0.6 | Inv. |
| C-4 | P-1 | 5 | R-1 | 5 | DEGBE | 15 | γ-BL | 5 | DEG | 5 | Si | 0.6 | Inv. |
| C-5 | P-1 | 5 | R-1 | 5 | 1,2-HDO | 5 | DEGBE | 10 | γ-BL | 15 | Si | 0.6 | Inv. |
| C-6 | P-1 | 5 | R-1 | 5 | DEGEE | 10 | 1,2-HDO | 5 | DMI | 7 | Si | 0.6 | Inv. |
| C-7 | P-1 | 5 | R-1 | 5 | DEGEE | 10 | 1,2-HDO | 5 | NMP | 7 | Si | 0.6 | Inv. |
| C-8 | P-1 | 5 | R-1 | 5 | DEGEE | 10 | 1,2-HDO | 5 | NEP | 7 | Si | 0.6 | Inv. |
| C-9 | P-1 | 5 | R-1 | 5 | DEGEE | 10 | 1,2-HDO | 5 | E-CL | 7 | Si | 0.6 | Inv. |
| C-10 | P-1 | 5 | R-1 | 5 | DEGEE | 10 | 1,2-HDO | 5 | MC | 7 | Si | 0.6 | Inv. |
| C-11 | P-1 | 5 | R-1 | 5 | TEGBE | 10 | 1,2-HDO | 5 | γ-BL | 5 | Si | 0.6 | Inv. |
| C-12 | P-1 | 5 | R-2 | 5 | TEGBE | 10 | 1,2-HDO | 5 | γ-BL | 5 | Si | 0.6 | Inv. |
| C-13 | P-1 | 5 | R-3 | 5 | TEGBE | 10 | 1,2-HDO | 5 | γ-BL | 5 | Si | 0.6 | Inv. |
| C-14 | P-1 | 5 | R-4 | 5 | TEGBE | 10 | 1,2-HDO | 5 | γ-BL | 5 | Si | 0.6 | Inv. |
| C-15 | P-1 | 5 | R-5 | 5 | TEGBE | 10 | 1,2-HDO | 5 | γ-BL | 5 | Si | 0.6 | Comp. |
| C-16 | P-1 | 5 | R-6 | 5 | TEGBE | 10 | 1,2-HDO | 5 | γ-BL | 5 | Si | 0.6 | Comp. |
| C-17 | P-1 | 5 | R-1 | 5 | 1,2-HDO | 4 | γ-BL | 5 | DEG | 10 | Si | 0.6 | Comp. |
| C-18 | P-1 | 5 | R-1 | 5 | DEGBE | 17 | γ-BL | 5 | DEG | 5 | Si | 0.6 | Comp. |
| C-19 | P-1 | 5 | R-1 | 5 | 1,2-HDO | 10 | γ-BL | 1.5 | DEG | 10 | Si | 0.6 | Comp. |
| C-20 | P-1 | 5 | R-1 | 5 | DEGBE | 10 | Γ-BL | 18 | DEG | 5 | Si | 0.6 | Comp. |
| C-21 | P-1 | 5 | R-7 | 5 | DEGEE | 10 | 1,2-HDO | 5 | MC | 7 | Si | 0.6 | Comp. |
| C-22 | P-1 | 5 | 60J | 5 | DEGEE | 10 | 1,2-HDO | 5 | MC | 7 | Si | 0.6 | Inv. |
| C-23 | P-1 | 5 | 70J | 5 | DEGEE | 10 | 1,2-HDO | 5 | MC | 7 | Si | 0.6 | Inv. |
| C-24 | P-1 | 5 | 70J | 5 | DEGEE | 10 | 1,2-HDO | 5 | MC | 7 | F | 0.3 | Inv. |
| C-25 | P-1 | 5 | R-1 | 3 | DEGEE | 10 | 1,2-HDO | 5 | MC | 7 | Si | 0.6 | Inv. |
| C-26 | P-1 | 5 | R-1 | 8 | DEGEE | 10 | 1,2-HDO | 5 | MC | 7 | Si | 0.6 | Inv. |
| C-27 | P-1 | 5 | R-1 | 5 | 1,2-HDO | 10 | γ-BL | 2.5 | DEG | 10 | Si | 0.6 | Inv. |
| C-28 | P-1 | 5 | R-1 | 5 | 1,2-HDO | 10 | γ-BL | 2.5 | DEG | 10 | Si | 0.6 | Inv. |
| C-29 | P-1 | 5 | R-1 | 5 | 1,2-HDO | 10 | γ-BL | 2.5 | DEG | 10 | Si | 0.6 | Inv. |
| C-30 | P-1 | 5 | R-1 | 5 | 1,2-HDO | 10 | γ-BL | 2.5 | DEG | 10 | Si | 0.6 | Inv. |

60J: Jhoncryl 60J (produced by BASF) MW = 8,500, Acid value = 215
70J: (produced by BASF) MW = 16,500, Acid value = 240
1,2-HDO: 1,2-hexanediol,
DEGBE: diethyleneglycol monobutyl ether
DEGEE: diethyleneglycol monoethyl ether,
DMI: 1,3-dimethyl-2-imidazolidinone
γ-BL: γ-butyrolactone,
DEG: diethylene glycol,
NMP: N-methylpyrrolidone,
ϵ-CL: ϵ-caprolactam,
NEP: N-ethylpyrrolidone,
MC: methylcaprolactam
Si: KF-351A (produced by Shin-Etsu Chemical Co., Ltd.)
F: Ftergent 251 (fluorine type surfactant, produced by Neos Co., Ltd.)
Inv.: The invention,
Comp.: Comparison (Preparation of 4-Color Ink)

A pigment dispersion, an ink-soluble resin, a water-soluble organic solvent and a surfactant were mixed as described in Table 3 and adjusted so as to make the total of 100 g by addition of ion-exchange water, followed by being filtered with a 5 μm filter, whereby an ink set comprising Y-1, M-1, C-1 and Bk-1 and a comparative ink set comprising Y-2, M-2, C-2 and Bk-2 were prepared.

TABLE 3

Unit: g

| Ink No. | Pigment dispersion Types | Amount | Ink-soluble resin Types | Amount | Water-soluble organic solvent (1) Types | Amount | Water-soluble organic solvent (2) Types | Amount | Water-soluble organic solvent (3) Types | Amount | Surfactant Types | Amount | Remarks |
|---|---|---|---|---|---|---|---|---|---|---|---|---|---|
| Y-1 | P-2 | 5 | R-1 | 5 | TEGBE | 7 | 1,2-HDO | 5 | γ-BL | 8 | Si | 0.5 | Inv. |
| M-1 | P-3 | 5 | R-1 | 5 | TEGBE | 8 | 1,2-HDO | 5 | γ-BL | 8 | Si | 0.5 | Inv. |
| C-1 | P-1 | 5 | R-1 | 5 | TEGBE | 10 | 1,2-HDO | 5 | γ-BL | 8 | Si | 0.5 | Inv. |
| Bk-1 | P-4 | 5 | R-1 | 5 | TEGBE | 10 | 1,2-HDO | 7 | γ-BL | 8 | Si | 0.5 | Inv. |
| Y-2 | P-2 | 5 | R-1 | 5 | TEGBE | 7 | 1,2-HDO | 5 | γ-BL | 1.5 | Si | 0.5 | Comp. |
| M-2 | P-3 | 5 | R-1 | 5 | TEGBE | 8 | 1,2-HDO | 5 | γ-BL | 1.5 | Si | 0.5 | Comp. |
| C-2 | P-1 | 5 | R-1 | 5 | TEGBE | 10 | 1,2-HDO | 5 | γ-BL | 1.5 | Si | 0.5 | Comp. |
| Bk-2 | P-4 | 5 | R-1 | 5 | TEGBE | 10 | 1,2-HDO | 7 | γ-BL | 1.5 | Si | 0.5 | Comp. |

DEGBE: diethylene glycol monobutyl ether,
1,2-HDO: 1,2-hexanediol
γ-BL: γ-butyrolactone
Si: KF-351A (produced by Shin-Etsu Chmical Co., Ltd.)
Inv.: The invention,
Comp.: Comparative example (Measurement of Dispersion Resin, Pigment Dispersion and Ink-soluble Resin)

The weight average molecular weight Mw and acid value of a synthesized dispersion resin and an ink-soluble resin, and the mean particle size of a pigment dispersion were measured according to the following methods. The results will be shown in Table 4.

(Measurement of Weight Average Molecular Weight)

Weight average molecular weight was measured by use of high speed liquid chromatography.

(Measurement of Mean Particle Size)

The mean particle size of a pigment dispersion is determined by Zetasizer-1000 (manufactured by Malvern Instruments Ltd.).

(Measurement of Acid Value)

Acid value was measured based on JTS K0070.

TABLE 4

| Resin No. | Weight average molecular weight Mw | Acid value |
|---|---|---|
| D-1 | 12000 | 117 |
| R-1 | 12000 | 155 |
| R-2 | 10000 | 194 |
| R-3 | 9000 | 155 |
| R-4 | 9000 | 117 |
| R-5 | 8000 | 311 |
| R-6 | 10000 | 78 |

<<Evaluation of Ink>>[Evaluation of Storage Stability]

The prepared ink was sealed and stored at 60° C. Change of mean particle size of an ink was observed through an electron-microscope and the number of days to cause variation of 15% was evaluated.

Evaluation 1: not less than 15% after 3 days
Evaluation 2: within 15% until 1 week
Evaluation 3: within 15% until 2 weeks
Evaluation 4: within 15% until 3 weeks
Evaluation 5: within 15% until 4 weeks

[Evaluation with Monochromatic Image]

With respect to monochromatic cyan ink prepared, image quality, durability, drying property, ejection stability, continuous print capability and recovery through maintenance were evaluated.

Evaluation was performed by use of a printer in which four piezo type heads were arranged in parallel and 4-color print was possible. Said printer can warm a medium from the bottom by a contact type heater, being equipped with a position for ink idle print and a maintenance unit in a head housing position, and can perform head cleaning in arbitrary frequency.

The prepared ink was filled in one head of the above-described printer to form a monochromatic image for evaluation. The evaluation condition was as follows.

Print resolution: 720 dpi×720 dpi (dpi is a dot number per 2.54 cm)

Head transfer speed: 200 mm/sec, 2-way print

Medium: vinyl chloride sheet (Digitalvinyl, Metamark UK Ltd.)

Medium heating temperature: print surface temperature of 50° C.

Evaluation image: wedge image, character, outline character

Evaluation environment: 20° C., relative humidity of 55%

(Image Quality)

Generation of repelling, beading due to ink mixing, and small font rendering were evaluated according to the following criteria.

1. Local repelling is observed and beading is violent not to reproduce small characters.
2. No repelling is observed, however, beading is remarkable not to reproduce small characters.
3. No repelling is observed, however, very slight beading was observed to make printing of small characters somewhat vague.
4. No repelling and no beading are observed and small characters can be printed, however, the reproducibility of outline characters is somewhat unclear.
5. No repelling and no beading are observed, and small characters and outline characters are clear.

(Durability)

Durability of images was evaluated based on the following criteria.

1. Images are taken off by wiping with dry cloth (Bemcot: Asahi Chemical Industry Co., Ltd.).
2. Images are not taken off by wiping with dry cloth; however, are taken off by wiping with cloth having been immersed in water.

3. Images are not taken off by wiping with dry cloth nor with cloth having been immersed in water; however, are taken off with a water/alcohol mixed solution.

4. Images are not taken off by wiping with dry cloth nor with cloth having been immersed in water; however, are taken off slightly with a water/alcohol mixed solution.

5. Images are not taken off by wiping with dry cloth and with cloth having been immersed in water, and are not taken off even with a water/alcohol mixed solution.

(Drying Property)

After a monochromatic solid image had been formed, the image portion was abraded every 30 seconds while continuing heating from the bottom of the medium at 50° C. and the time until a swab becomes not to be colored was measured, whereby evaluation was made based on the following criteria.

1: not shorter than 4 minutes

2: not shorter than 3 minutes 30 seconds and shorter than 4 minutes

3: not shorter than 3 minutes and shorter than 3 minutes 30 seconds

4: not shorter than 2 minutes 30 seconds and shorter than 3 minutes

5: shorter than 2 minutes 30 seconds (Ejection Stability)

After consecutive 10 sheets of the above-described evaluation image (A4 size) had been formed, the image was formed again after 60 minutes interval to be evaluated based on the following criteria.

1. Many image defects (poor ink ejection) are observed.
2. Image defects are observed.
3. Few image defects are observed, however, small character reproduction is deteriorated. Satellites are observed with a dot when being observed at magnification.
4. No image defects are observed, however, very slight blur is observed in the print start portion (a few mm) of images.
5. No image defects are observed including, the print start portion of images.

(Continuous Printability)

The above-described evaluation image (A4 size) was formed without nozzle cleaning until consecutive 100 sheets and the image quality was evaluated. print.

1. Ejection lacks were generated before 10 sheets
2. Ejection lacks were generated during 20-50 sheets print.
3. Initial print quality can be obtained until 50 sheets print; however, small character reproducibility was slightly deteriorated thereafter.
4. Initial print quality can be obtained until 70 sheets print; however, small character reproducibility was slightly deteriorated thereafter.
5. Initial print quality can be obtained until 100 sheets print.

(Recovery through Maintenance)

After consecutive 10 sheets of the above-described evaluation image had been formed, 1 day was spent. Thereafter, cleaning of a set of ink idle print and wiping was performed as nozzle cleaning, and consecutive 80 sheets of image formation was performed again, whereby image quality was evaluated based on the following criteria.

1. Recovery is not observed and there are many image defects.
2. Recovery is insufficient and there are image defects.
3. Recovery is observed, however, printability of small characters is slightly deteriorated after 10 sheets printing.
4. Recovery is observed, however, printability of small characters is slightly deteriorated after 30 sheets printing.
5. Recovery is observed and consecutive 50 sheets printing is possible.

Each evaluation result of inks will be shown in Table 5.

TABLE 5

| Ink No. | Image quality | Durability | Drying property | Ejection stability | Consecutive printability | *1 | Remarks |
| --- | --- | --- | --- | --- | --- | --- | --- |
| C-1 | 3 | 4 | 3 | 5 | 5 | 5 | The invention |
| C-2 | 5 | 3 | 4 | 4 | 4 | 5 | The invention |
| C-3 | 4 | 5 | 5 | 5 | 5 | 5 | The invention |
| C-4 | 4 | 4 | 4 | 4 | 4 | 5 | The invention |
| C-5 | 4 | 4 | 4 | 4 | 4 | 5 | The invention |
| C-6 | 5 | 5 | 4 | 4 | 4 | 4 | The invention |
| C-7 | 5 | 5 | 4 | 4 | 4 | 4 | The invention |
| C-8 | 5 | 5 | 4 | 4 | 4 | 4 | The invention |
| C-9 | 5 | 4 | 4 | 4 | 4 | 4 | The invention |
| C-10 | 4 | 4 | 4 | 4 | 4 | 4 | The invention |
| C-11 | 4 | 4 | 4 | 4 | 4 | 4 | The invention |
| C-12 | 4 | 4 | 4 | 4 | 4 | 4 | The invention |
| C-13 | 4 | 4 | 4 | 4 | 4 | 4 | The invention |
| C-14 | 4 | 4 | 4 | 4 | 4 | 4 | Comparison |
| C-15 | 2 | 2 | 3 | 3 | 3 | 3 | Comparison |
| C-16 | 2 | 2 | 3 | 2 | 3 | 3 | Comparison |
| C-17 | 2 | 4 | 4 | 3 | 3 | 3 | Comparison |
| C-18 | 3 | 4 | 2 | 2 | 2 | 2 | Comparison |
| C-19 | 3 | 2 | 3 | 3 | 3 | 2 | Comparison |
| C-20 | 2 | 3 | 2 | 1 | 2 | 2 | Comparison |
| C-21 | 3 | 2 | 3 | 3 | 2 | 3 | Comparison |
| C-22 | 4 | 4 | 4 | 4 | 4 | 4 | The invention |
| C-23 | 4 | 4 | 4 | 4 | 4 | 4 | The invention |
| C-24 | 4 | 4 | 4 | 4 | 4 | 4 | The invention |
| C-25 | 4 | 3 | 4 | 5 | 4 | 5 | The invention |
| C-26 | 4 | 5 | 4 | 4 | 4 | 4 | The invention |
| C-27 | 5 | 4 | 4 | 4 | 4 | 5 | The invention |
| C-28 | 5 | 5 | 4 | 4 | 4 | 5 | The invention |
| C-29 | 5 | 5 | 4 | 4 | 4 | 4 | The invention |
| C-30 | 5 | 5 | 4 | 4 | 4 | 5 | The invention |

*1: Recovery through maintenance

It is clear from the table that inks of this invention are superior to comparative inks in any of the above-described evaluations.

[Evaluation with 4-Color Image]

Each of an ink set employing all inks of this invention and a comparative ink set was filled in 4 heads, respectively, to form a color image.

The evaluation condition was set similar to that of a monochromatic image.

Inks of this invention exhibited no generation of color bleed, and no generation of repelling or beading even at a high print duty area such as a secondary color ink, resulting in preparation of an excellent image.

On the other hand, comparative inks showed unsatisfactory image quality with generation of beading and color bleed.

[Evaluation of Heating Temperature at Recording]

Utilizing prepared monochromatic cyan ink C-2, varying the medium heating temperature over 25 (without heating)-85° C. and in a similar manner to evaluation of a monochromatic image as for other conditions, evaluation of image quality, image durability, drying property, ejection stability, continuous print capability and recovery through maintenance were performed.

The evaluation results will be shown in Table 6.

TABLE 6

| | Medium heating temperature (° C.) | | | | | | |
|---|---|---|---|---|---|---|---|
| | none (25) | 35 | 45 | 55 | 65 | 75 | 85 |
| Image quality | 1 | 3 | 4 | 5 | 5 | 4 | 3 |
| Durability | 2 | 3 | 3 | 3 | 3 | 3 | 3 |
| Drying property | 2 | 3 | 4 | 4 | 4 | 4 | 4 |
| Ejection stability | 4 | 4 | 4 | 4 | 3 | 3 | 3 |
| Continuous printability | 4 | 4 | 4 | 4 | 3 | 3 | 3 |
| Recovery through maintenance | 4 | 4 | 4 | 4 | 3 | 3 | 3 |

It is clear that, in inks of this invention, drying property of an ink is remarkably improved and high image quality is obtained as well as durability of an image is improved, by printing with heating of a recording medium. As for the heating temperature, it is clear that a recording surface temperature of a recording medium of 40-80° C. is preferable.

What is claimed is:

1. An inkjet recording ink for printing on a heated recording medium, comprising:
   at least (1) a pigment, (2) an ink-soluble resin of 3-10 weight % based on a solid content, the ink-soluble resin dissolved in the ink, (3) a water-soluble organic solvent combination, and (4) a silicone surfactant or a fluorine surfactant, and the ink-soluble resin and the water-soluble organic solvent combination satisfy the following conditions:
   1) at least one type of the ink-soluble resin is provided with a carboxyl group as an acid group, and an acid value between not less than 80 but less than 300, and
   2) the water-soluble organic solvent combination contains at least a combination of 5-15 weight % of solvent A, and 2-15 weight % of solvent B;
   Solvent A: glycol ether or 1,2-alkanediols,
   Solvent B: a cyclic solvent containing a nitrogen or a sulfur atom, a cyclic ester solvent or dimethyl sulfide, and
   3) the ink-soluble resin is soluble against an ink vehicle except a pigment, a dispersion resin and soluble resin, at not less than 10 weight % based on solid content at 25° C.

2. The water-based ink-jet recording ink described in claim 1, wherein the ink-soluble resin has a weight average molecular weight of 3000-30000, and a glass transition temperature of −30 to 100° C., and an acid group derived from an acid monomer which has been partially or completely neutralized by an amine having a boiling point of less than 200° C.

3. The water-based ink-let recording ink described in claim 2, wherein the amine having a boiling point of less than 200° C. is selected from ammonia, an alkanolamine, and an alkylamine.

4. The water-based ink-jet recording ink described in claim 1, wherein the ink contains an aqueous emulsion polymer.

* * * * *